(12) United States Patent
Matsuda et al.

(10) Patent No.: US 8,150,166 B2
(45) Date of Patent: Apr. 3, 2012

(54) METHODS AND SYSTEMS FOR IDENTIFYING TEXT IN DIGITAL IMAGES

(75) Inventors: Toyohisa Matsuda, Matsudo (JP); Richard John Campbell, Camas, WA (US); Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/007,951

(22) Filed: Jan. 17, 2011

(65) Prior Publication Data

US 2011/0110596 A1    May 12, 2011

Related U.S. Application Data

(62) Division of application No. 11/470,519, filed on Sep. 6, 2006, now Pat. No. 7,876,959.

(51) Int. Cl.
*G06K 9/46* (2006.01)

(52) U.S. Cl. .......................... 382/190; 382/173

(58) Field of Classification Search .................. 382/173, 382/176, 190, 286, 302; 358/3.01
See application file for complete search history.

(56) References Cited

U.S. PATENT DOCUMENTS

| | | | |
|---|---|---|---|
| 4,414,635 A | 11/1983 | Gast et al. | |
| 4,741,046 A | 4/1988 | Matsunawa et al. | |
| 5,001,767 A | 3/1991 | Yoneda et al. | |
| 5,034,988 A | 7/1991 | Fujiwara | |
| 5,157,740 A | 10/1992 | Klein et al. | |
| 5,265,173 A | 11/1993 | Griffin et al. | |
| 5,280,367 A | 1/1994 | Zuniga | |
| 5,293,430 A | 3/1994 | Shiau et al. | |
| 5,339,172 A | 8/1994 | Robinson | |
| 5,353,132 A | 10/1994 | Katsuma | |
| 5,379,130 A | 1/1995 | Wang et al. | |
| 5,481,622 A | 1/1996 | Gerhardt et al. | |
| 5,546,474 A | 8/1996 | Zuniga | |
| 5,581,667 A | 12/1996 | Bloomberg | |
| 5,588,072 A | 12/1996 | Wang | |
| 5,642,137 A | 6/1997 | Kitazumi | |
| 5,649,025 A | 7/1997 | Revankar | |
| 5,682,249 A | 10/1997 | Harrington et al. | |
| 5,689,575 A | 11/1997 | Sako et al. | |
| 5,694,228 A | 12/1997 | Peairs et al. | |
| 5,696,842 A | 12/1997 | Shirasawa et al. | |
| 5,767,978 A | 6/1998 | Revankar et al. | |
| 5,768,403 A | 6/1998 | Suzuki et al. | |
| 5,778,092 A | 7/1998 | MacLeod et al. | |
| 5,809,167 A | 9/1998 | Al-Hussein | |

(Continued)

FOREIGN PATENT DOCUMENTS

JP    H06/152945 A    5/1994

(Continued)

OTHER PUBLICATIONS

Jean Duong, Hubert Empotz and Ching Y. Suen, Extraction of Text Areas in Printed Document Images, ACM Symposium on Document Engineering, Nov. 9-10, 2001, pp. 157-164, Atlanta, GA USA.

(Continued)

*Primary Examiner* — Duy M Dang
(74) *Attorney, Agent, or Firm* — Kristine Elizabeth Matthews; David C. Ripma

(57) ABSTRACT

Aspects of the present invention relate to systems, methods and devices for detection of text in an image using an initial text classification result and a verification process.

10 Claims, 14 Drawing Sheets

U.S. PATENT DOCUMENTS

| | | | |
|---|---|---|---|
| 5,848,185 | A | 12/1998 | Koga et al. |
| 5,854,853 | A | 12/1998 | Wang |
| 5,867,277 | A | 2/1999 | Melen et al. |
| 5,900,953 | A | 5/1999 | Bottou et al. |
| 5,903,363 | A | 5/1999 | Yaguchi et al. |
| 5,917,945 | A | 6/1999 | Cymbalski |
| 5,923,775 | A | 7/1999 | Snyder et al. |
| 5,943,443 | A | 8/1999 | Itonori et al. |
| 5,946,420 | A | 8/1999 | Noh |
| 5,949,555 | A | 9/1999 | Sakai et al. |
| 5,956,468 | A | 9/1999 | Ancin |
| 5,960,104 | A | 9/1999 | Conners et al. |
| 5,987,171 | A | 11/1999 | Wang |
| 5,995,665 | A | 11/1999 | Maeda |
| 6,020,979 | A | 2/2000 | Zeck et al. |
| 6,084,984 | A | 7/2000 | Ishikawa |
| 6,175,427 | B1 | 1/2001 | Lehmbeck et al. |
| 6,175,650 | B1 | 1/2001 | Sindhu et al. |
| 6,178,260 | B1 | 1/2001 | Li et al. |
| 6,198,797 | B1 | 3/2001 | Majima et al. |
| 6,215,904 | B1 | 4/2001 | Lavalle |
| 6,222,932 | B1 | 4/2001 | Rao et al. |
| 6,233,353 | B1 | 5/2001 | Danisewicz |
| 6,246,791 | B1 | 6/2001 | Kurzweil et al. |
| 6,252,994 | B1 | 6/2001 | Nafarieh |
| 6,256,413 | B1 | 7/2001 | Hirabayshi |
| 6,272,240 | B1 | 8/2001 | Li et al. |
| 6,298,173 | B1 | 10/2001 | Lopresti |
| 6,301,381 | B1 | 10/2001 | Hayashi |
| 6,308,179 | B1 | 10/2001 | Petersen et al. |
| 6,347,153 | B1 | 2/2002 | Triplette et al. |
| 6,360,007 | B1 | 3/2002 | Robinson et al. |
| 6,360,009 | B2 | 3/2002 | Li et al. |
| 6,373,981 | B1 | 4/2002 | de Queiroz et al. |
| 6,389,164 | B2 | 5/2002 | Li et al. |
| 6,400,844 | B1 | 6/2002 | Fan et al. |
| 6,473,522 | B1 | 10/2002 | Lienhart et al. |
| 6,522,791 | B2 | 2/2003 | Nagarajan |
| 6,526,181 | B1 | 2/2003 | Smith et al. |
| 6,535,633 | B1 | 3/2003 | Schweid et al. |
| 6,577,762 | B1 | 6/2003 | Seeger et al. |
| 6,594,401 | B1 | 7/2003 | Metcalfe et al. |
| 6,661,907 | B2 | 12/2003 | Ho et al. |
| 6,668,080 | B1 | 12/2003 | Torr et al. |
| 6,718,059 | B1 | 4/2004 | Uchida |
| 6,728,391 | B1 | 4/2004 | Wu et al. |
| 6,728,399 | B1 | 4/2004 | Doll |
| 6,731,789 | B1 | 5/2004 | Tojo |
| 6,731,800 | B1 | 5/2004 | Barthel et al. |
| 6,766,053 | B2 | 7/2004 | Fan et al. |
| 6,778,291 | B1 | 8/2004 | Clouthier |
| 6,782,129 | B1 | 8/2004 | Li et al. |
| 6,901,164 | B2 | 5/2005 | Sheffer |
| 6,950,114 | B2 | 9/2005 | Honda et al. |
| 6,993,185 | B2 | 1/2006 | Guo et al. |
| 7,020,332 | B2 | 3/2006 | Nenonen et al. |
| 7,027,647 | B2 | 4/2006 | Mukherjee et al. |
| 7,062,099 | B2 | 6/2006 | Li et al. |
| 7,079,687 | B2 | 7/2006 | Guleryuz |
| 7,133,565 | B2 | 11/2006 | Toda et al. |
| 7,181,059 | B2 | 2/2007 | Duvdevani et al. |
| 7,190,409 | B2 | 3/2007 | Yamazaki et al. |
| 7,206,443 | B1 | 4/2007 | Duvdevani et al. |
| 7,221,805 | B1 | 5/2007 | Bachelder |
| 7,483,484 | B2 | 1/2009 | Liu et al. |
| 7,518,755 | B2 | 4/2009 | Gotoh et al. |
| 7,538,907 | B2 | 5/2009 | Nagasaka |
| 7,746,392 | B2 | 6/2010 | Hayaishi |
| 2001/0016077 | A1 | 8/2001 | Oki |
| 2001/0050785 | A1 | 12/2001 | Yamazaki |
| 2002/0027617 | A1 | 3/2002 | Jeffers et al. |
| 2002/0031268 | A1 | 3/2002 | Prabhakar et al. |
| 2002/0037100 | A1 | 3/2002 | Toda et al. |
| 2002/0064307 | A1 | 5/2002 | Koga et al. |
| 2002/0076103 | A1 | 6/2002 | Lin et al. |
| 2002/0106133 | A1 | 8/2002 | Edgar et al. |
| 2002/0110283 | A1 | 8/2002 | Fan et al. |
| 2002/0168105 | A1 | 11/2002 | Li |
| 2003/0086127 | A1 | 5/2003 | Ito et al. |
| 2003/0107753 | A1 | 6/2003 | Sakamoto |
| 2003/0133612 | A1 | 7/2003 | Fan |
| 2003/0133617 | A1 | 7/2003 | Mukherjee |
| 2003/0156760 | A1 | 8/2003 | Navon et al. |
| 2004/0001624 | A1 | 1/2004 | Curry et al. |
| 2004/0001634 | A1 | 1/2004 | Mehrotra |
| 2004/0042659 | A1 | 3/2004 | Guo et al. |
| 2004/0083916 | A1 | 5/2004 | Isshiki |
| 2004/0096102 | A1 | 5/2004 | Handley |
| 2004/0119856 | A1 | 6/2004 | Nishio et al. |
| 2004/0179742 | A1 | 9/2004 | Li |
| 2004/0190027 | A1 | 9/2004 | Foster et al. |
| 2004/0190028 | A1 | 9/2004 | Foster et al. |
| 2004/0205568 | A1 | 10/2004 | Breuel et al. |
| 2004/0240733 | A1 | 12/2004 | Hobson et al. |
| 2005/0008221 | A1 | 1/2005 | Hull et al. |
| 2005/0100219 | A1 | 5/2005 | Berkner et al. |
| 2005/0100220 | A1 | 5/2005 | Keaton et al. |
| 2005/0129310 | A1 | 6/2005 | Herley |
| 2005/0163374 | A1 | 7/2005 | Ferman et al. |
| 2005/0174586 | A1 | 8/2005 | Yoshida et al. |
| 2005/0180647 | A1 | 8/2005 | Curry et al. |
| 2005/0219390 | A1 | 10/2005 | Tajima et al. |
| 2005/0248671 | A1 | 11/2005 | Schweng |
| 2005/0276510 | A1 | 12/2005 | Bosco et al. |
| 2005/0281474 | A1 | 12/2005 | Huang |
| 2005/0286758 | A1 | 12/2005 | Zitnick et al. |
| 2006/0072830 | A1 | 4/2006 | Nagarajan et al. |
| 2006/0133690 | A1 | 6/2006 | Bloomberg et al. |
| 2006/0153441 | A1 | 7/2006 | Li |
| 2006/0221090 | A1 | 10/2006 | Takeshima et al. |
| 2006/0229833 | A1 | 10/2006 | Pisupati et al. |
| 2006/0269159 | A1 | 11/2006 | Kim et al. |
| 2007/0291120 | A1 | 12/2007 | Campbell et al. |
| 2008/0123945 | A1 | 5/2008 | Andrew et al. |
| 2008/0212864 | A1 | 9/2008 | Bornefalk |
| 2008/0301767 | A1 | 12/2008 | Picard et al. |
| 2008/0310721 | A1 | 12/2008 | Yang et al. |

FOREIGN PATENT DOCUMENTS

| | | | |
|---|---|---|---|
| JP | H07/107275 | A | 4/1995 |
| JP | H08/065514 | A | 3/1996 |
| JP | H09/186861 | A | 7/1997 |
| JP | H09/204525 | A | 8/1997 |
| JP | H09/251533 | A | 9/1997 |
| JP | H11/213090 | A | 6/1999 |
| JP | 2002/325182 | A | 11/2002 |
| JP | 2003/008909 | A | 1/2003 |
| JP | 2003/123072 | A | 4/2003 |
| JP | 2003/303346 | A | 10/2003 |
| JP | 2004/110606 | A | 4/2004 |
| JP | 2005/159576 | A | 6/2005 |
| JP | 2005/210650 | A | 8/2005 |
| JP | 2005/353101 | A | 12/2005 |
| JP | 2007/235953 | A | 9/2007 |
| WO | 2005/067586 | A2 | 7/2005 |
| WO | 2006/066325 | A1 | 6/2006 |

OTHER PUBLICATIONS

Feng et al., "Exploring the Use of Conditional Random Field Models and HMMs for Historical Handwritten Document Recognition," DIAL'06, Apr. 2006, pp. 1-8, IEEE.

Richard Berry and Jim Burnell, "The histogram is a graph of pixel value versus the number of pixels having that value," 2000, pp. 1-3, from: www.willbell.com/AIP4Win_Updater/Histogram%20Tool.pdf.

Rainer Lienhart and Axel Wernicke, "Localizing and Segmenting Text in Images and Videos," IEEE Transactions on Circuits and Systems for Video Technology, Apr. 2002, pp. 256-268, vol. 12, No. 4, IEEE, USA.

U.S. Appl. No. 11/424,281—Office Action dated Jun. 9, 2009.
U.S. Appl. No. 11/424,296—Office Action dated Apr. 2, 2009.
U.S. Appl. No. 11/424,290—Office Action dated Nov. 27, 2007.
U.S. Appl. No. 11/424,290—Office Action dated May 28, 2008.
U.S. Appl. No. 11/424,290—Office Action dated Oct. 27, 2008.

U.S. Appl. No. 11/424,290—Supplemental Office Action dated Feb. 10, 2009.
U.S. Appl. No. 11/367,244—Office Action dated Mar. 30, 2009.
Japanese Patent Application No. 2007-229562—Office Action dated Mar. 3, 2009.
U.S. Appl. No. 11/424,290—Office Action dated Jul. 17, 2009.
U.S. Appl. No. 11/367,244—Office Action dated Nov. 3, 2009.
U.S. Appl. No. 11/424,281—Office Action dated Nov. 13, 2009.
U.S. Appl. No. 11/424,296—Office Action dated Oct. 28, 2009.
Japanese Patent Application No. 2007-035511—Office Action dated Jul. 21, 2009.
Japanese Patent Application No. 2007-035511—Office Action dated Dec. 15, 2009.
U.S. Appl. No. 11/367,244—Office Action dated Apr. 30, 2010.
U.S. Appl. No. 11/470,519—Office Action dated May 27, 2010.
U.S. Appl. No. 11/424,296—Office Action dated Apr. 16, 2010.
U.S. Appl. No. 11/424,290—Office Action dated Dec. 21, 2010.
U.S. Appl. No. 11/424,297—Office Action dated May 5, 2010.
U.S. Appl. No. 11/424,297—Office Action dated Oct. 22, 2009.
U.S. Appl. No. 11,4241297—Office Action dated Apr. 28, 2009.
U.S. Appl. No. 11/367,244—Notice of Allowance dated Oct. 7, 2010.
U.S. Appl. No. 11/470,519—Notice of Allowance dated Sep. 20, 2010.
U.S. Appl. No. 11/424,281—Notice of Allowance dated May 3, 2010.
U.S. Appl. No. 11/424,296—Office Action dated Jan. 20, 2011.
U.S. Appl. No. 12/982,718—Office Action Mar. 31, 2011.
Japanese Patent Application No. 2007-159364—Office Action dated Jan. 25, 2011.
Japanese Patent Application No. 2007-159363—Office Action dated Jan. 25, 2011.
U.S. Appl. No. 11/424,297—Notice of Allowance dated Sep. 1, 2010.
U.S. Appl. No. 11/424,296—Office Action dated Sep. 16, 2011.
U.S. Appl. No. 11/424,290—Office Action dated Sep. 1, 2011.

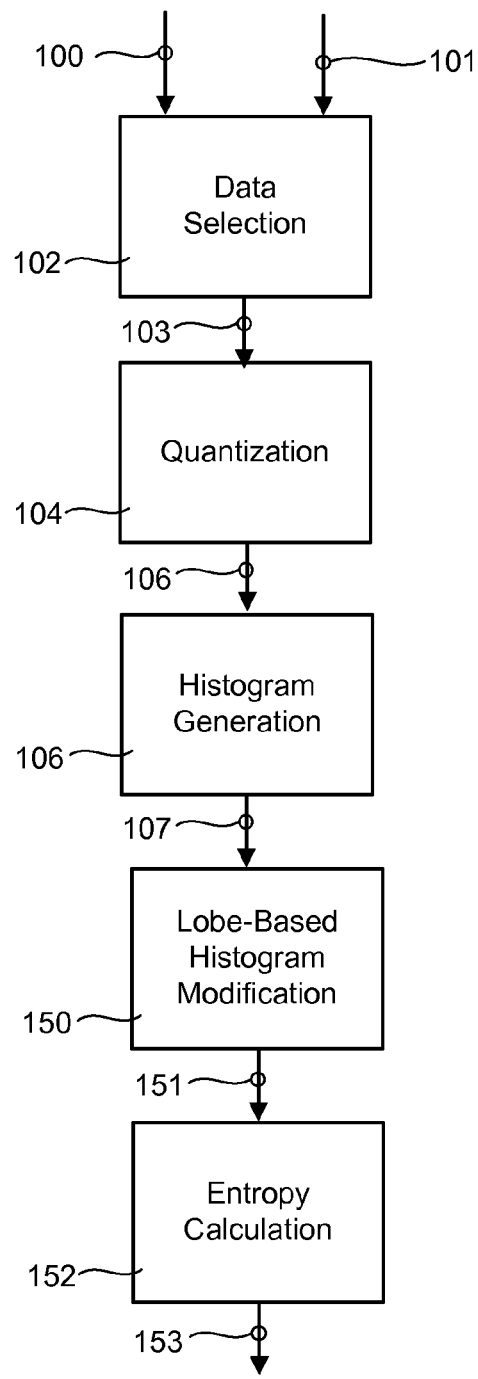
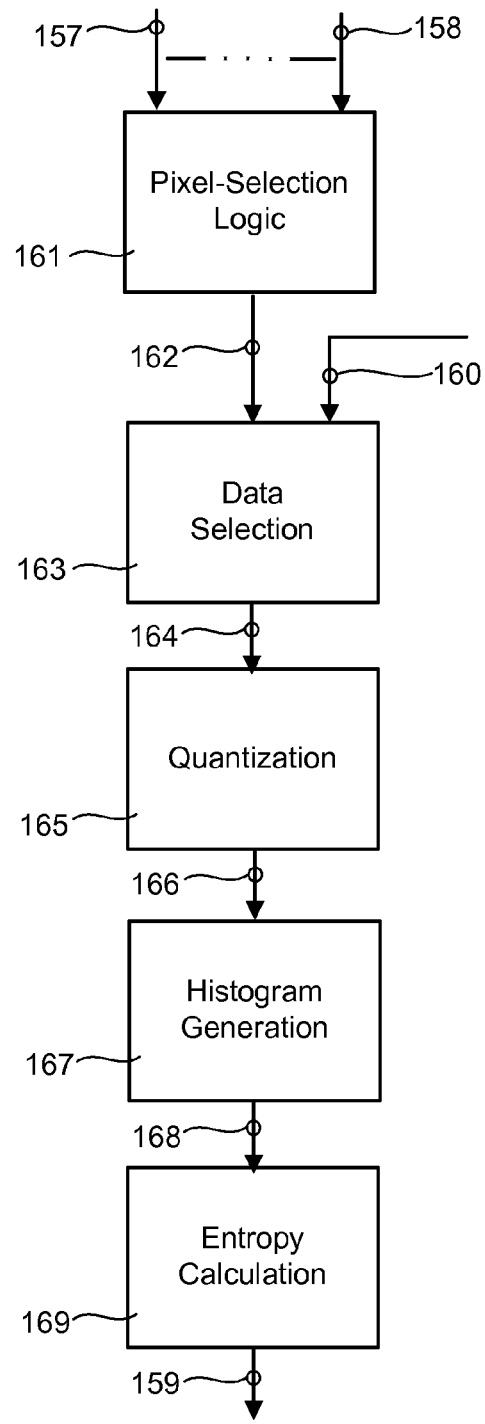
FIG. 15
FIG. 16

METHODS AND SYSTEMS FOR IDENTIFYING TEXT IN DIGITAL IMAGES

CROSS REFERENCE TO RELATED APPLICATIONS

This application is a divisional application of U.S. patent application Ser. No. 11/470,519, entitled "Methods and Systems for Identifying Text in Digital Images," filed on Sep. 6, 2006, invented by Toyohisa Matsuda, Richard John Campbell and Lawrence Shao-hsien Chen, now U.S. Pat. No. 7,876,959, said application, U.S. patent application Ser. No. 11/470,519, is hereby incorporated by reference herein, in its entirety.

FIELD OF THE INVENTION

Embodiments of the present invention comprise methods and systems for identifying text pixels in digital images.

BACKGROUND

Image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of regions containing text is seldom desirable. Reliable and efficient detection of text in digital images is advantageous so that content-type-specific image enhancement methods may be applied to the appropriate regions in a digital image.

SUMMARY

Embodiments of the present invention comprise methods and systems for identifying text in a digital image using an initial text classification and a verification process.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 15 is a diagram showing exemplary embodiments of the present invention comprising lobe-based histogram modification;

FIG. 16 is a diagram showing exemplary embodiments of the present invention comprising pixel selection logic using multiple mask inputs;

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
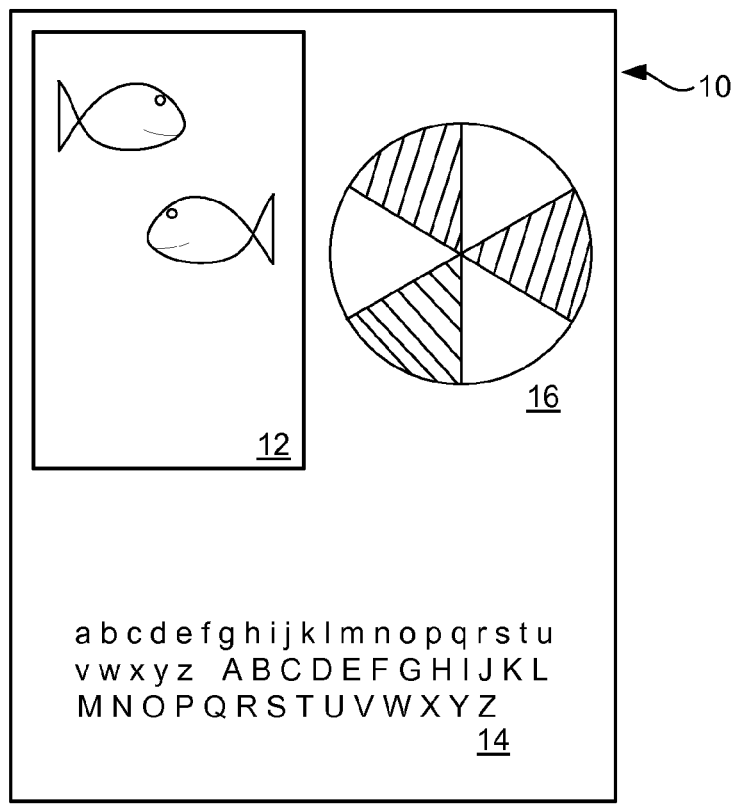
FIG. 1 is an example of an image comprising a multiplicity of regions of different content type.

FIG. 1 shows an image 10 comprising three regions: a pictorial region 12, a text region 14, and a graphics region 16. For many image processing, compression, document management, and other applications, it may be desirable to detect various regions in an image. Exemplary regions may include:

a pictorial region, a text region, a graphics region, a half-tone region, a text-on-half-tone region, a text-on-background region, a text-on-a-picture region, a continuous-tone region, a color region, a black-and-white region, a region best compressed by Joint Photographic Experts Group (JPEG) compression, a region best compressed by Joint Bi-level Image Experts Group (JBIG) compression, a background region, and a foreground region. It may also be desirable to identify pixels that are part of text, considered text pixels, in the digital image. Pixels in a pictorial region near, and on, a strong edge or other high-frequency feature may be misclassified as text pixels due to the strong edge nature of text. Half-tone pixels may also be misclassified as text pixels due to the high-frequency content of some half-tone patterns.

Verification of candidate text pixels to eliminate false positives, that is pixels identified as candidate text pixels that are not text pixels, and to resolve misses, that is text pixels that were not labeled as candidate text pixels, but are text pixels, may use a verification process based on edge information and image segmentation.

Figure 2:
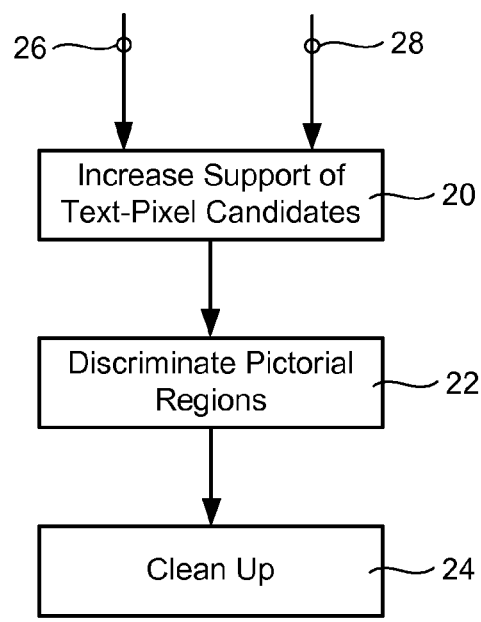
FIG. 2 is a diagram showing embodiments of the present invention comprising generating text candidates with increased support over initial segmentation followed by entropy-based discrimination of pictorial regions.

Embodiments of the present invention shown in FIG. 2 comprise increasing the support of text-pixel candidates 20, followed by discrimination of pictorial regions 22, and clean-up 24 to produce a verification and refinement of candidate text pixels identified by a prior text detection process. Prior detection of text in the digital image may be performed by any of numerous methods known in the art thereby producing a labeling of pixels in the digital image as candidate text edges 26 and raw edge information 28 which may be used to increase the support of candidate text pixels.

In some embodiments, a pixel may be labeled as a candidate text pixel based on a busyness measure in a region surrounding the pixel. The labeling, designated text map 26, may be represented by a one-bit image in which, for example, a bit-value of one may indicate the pixel is a text candidate, whereas a bit-value of zero may indicate the pixel is not considered a text candidate. In some embodiments of the present invention shown in FIG. 3, the raw edge information 28 may comprise a multi-bit label at each pixel in the image wherein any of the labels indicating a possible edge may be mapped 27 to a one-bit image, designated edge map 29, indicating pixels belonging to an edge of any type. The resolution of the one-bit maps, text 26 and edge 29, may be, in some embodiments, the same resolution as the input image.

In some embodiments, the edge map may be derived from applying a significance threshold to the response of an edge kernel. Many edge kernels and edge detection techniques exist in prior art.

In some embodiments, the text map may be derived from a texture feature known as busyness. The measure may differentiate halftone dots from lines and sharp edges from blurred edges. The measure along with edge map may be used to generate text map 26 by eliminating edges that coincide with halftone dot transitions and blurry edges that are less likely to be from text.

In some embodiments, the text map 26 may be derived by identifying edges whose intensity image curvature properties conform to proximity criteria.

In some embodiments, the text map 26 may be derived from the edge ratio features that measure the ratio of strong edges to weak edges and the ratio of edges to pixels for a local region of support.

In some embodiments, the text map 26 may be derived from other techniques known in the art.

Figure 3:
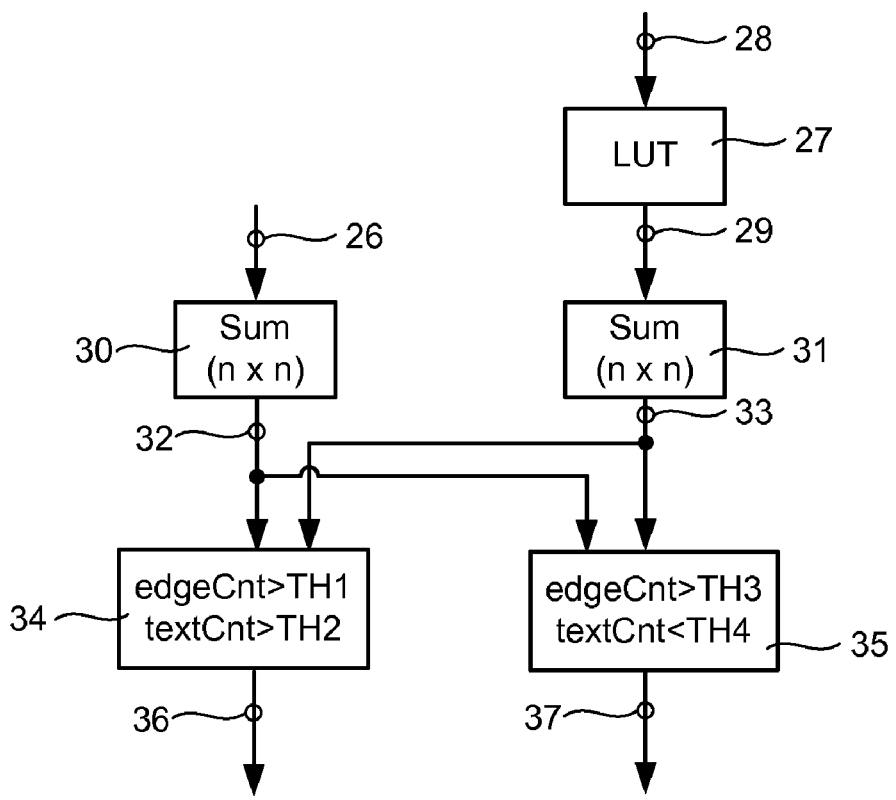
FIG. 3 is a diagram showing embodiments of the present invention in which a counting process may be used to increase the support of the image features.

As shown in FIG. 3, in some embodiments of the present invention, the one-bit maps, text 26 and edge 29, may be reduced in resolution 30 and 31, respectively. The reduction is done in such a way as to preserve high resolution information, while increasing area of support and enabling more computationally efficient lower resolution operations. The reduced resolution map corresponding to text 26 may be designated textCnt 32, and the reduced resolution map corresponding to edge 29 may be designated edgeCnt 33. The reduction in resolution may be accomplished by replacing each non-overlapping n×n neighborhood of pixels in a respective map by the sum of the bit values in the n×n neighborhood thus effecting a reduction from an N×N map to an $$\frac{N}{n} \times \frac{N}{n}$$

map, textCnt 32 and edgeCnt 33 for text 26 and edge 29, respectively. For example, for input one-bit maps of 600 dots-per-inch (dpi), an 8×8 summing operation will yield 75 dpi maps with entries ranging from 0 to 64 requiring 6 bits to represent each sum. In some embodiments, a sum of 0 and 1 may be represented by the same entry, therefore requiring only 5-bit maps.

On a pixel-by-pixel basis the pixels of textCnt 32 and edgeCnt 33 may be compared to thresholds and the results combined logically, 34 and 35, producing a text candidate map, textCandidate 36, and a pictorial candidate map, pictCandidate 37. If for a given pixel, (edgeCnt>TH1) and (busyCnt>TH2) 34, then the corresponding pixel in the map textCandidate 36 may be set to indicate the pixel is a text candidate. If for a given pixel, (edgeCnt>TH3) and (busyCnt<TH4) 35, then the corresponding pixel in the map pictCandidate 37 may be set to indicate the pixel is a pictorial candidate. In some embodiments, TH1 and TH3 may be equal.

Figure 4:
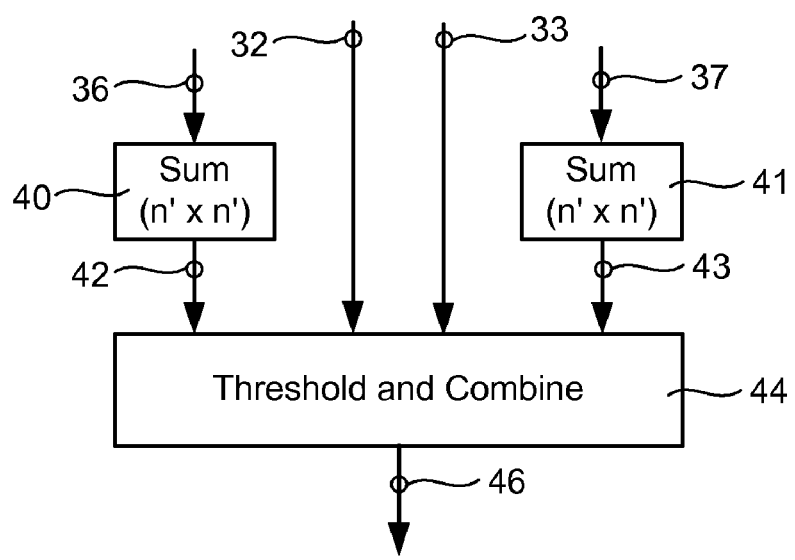
FIG. 4 is a diagram showing embodiments of the present invention in which a refined text map may be generated.

The maps textCandidate 36, pictCandidate 37, edgeCnt 33 and textCnt 32 may be combined after incorporating neighborhood information into textCandidate 36 and pictCandidate 37, thereby expanding the support region of these labels. Embodiments in which the support region of the labels may be expanded are shown in FIG. 4. New maps, textCandidateCnt 42 and pictCandidateCnt 43, may be formed by summing 40, 41 the pixel values in a moving n'×n' window in textCandidate 36 and pictCandidate 37, respectively. Pixels for which the entire n'×n' window is not contained within the map may be treated by any of the acceptable methods known in the art including boundary extension and zero padding. The maps textCandidateCnt 42, pictCandidateCnt 43, textCnt 32 and edgeCnt 33 may be combined 44 according to:

$$\frac{textCandidateCnt}{textCandidateCnt + pictCandidateCnt} > TH5 \ \&$$

$$edgeCnt > TH6 \ \&$$

$$busyCnt > TH7$$

on a pixel-by-pixel basis forming a revised text candidate map 46, designated textCandidateMap.

A masked-entropy measure may be used to discriminate between text and pictorial regions given the revised text candidate map 46, textCandidateMap, the edge information, edgeCnt 33, and the luminance channel of the original image. The discrimination may provide a further refinement of identified text in the digital image.

Figure 5:
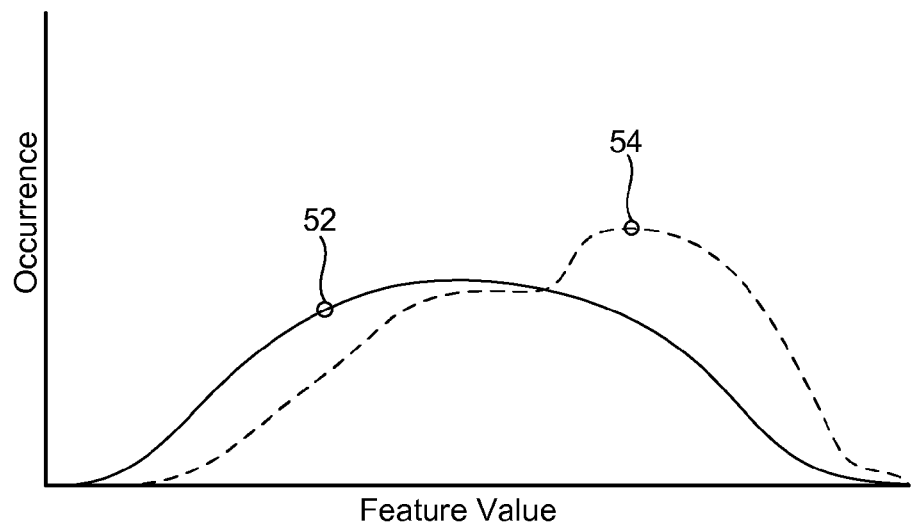
FIG. 5 is an exemplary histogram showing feature value separation.

The effectiveness and reliability of a region-detection system may depend on the feature or features used for the classification. FIG. 5 shows an example of normalized frequency-of-occurrence plots of the values of a feature for two different image regions. The solid line 52 shows the frequency of occurrence of feature values extracted from image samples belonging to one region. The dashed line 54 shows the frequency of occurrence of feature values extracted from image samples belonging to a second region. The strong overlap of these two curves may indicate that the feature may not be an effective feature for separating image samples belonging to one of these two regions.

Figure 6:
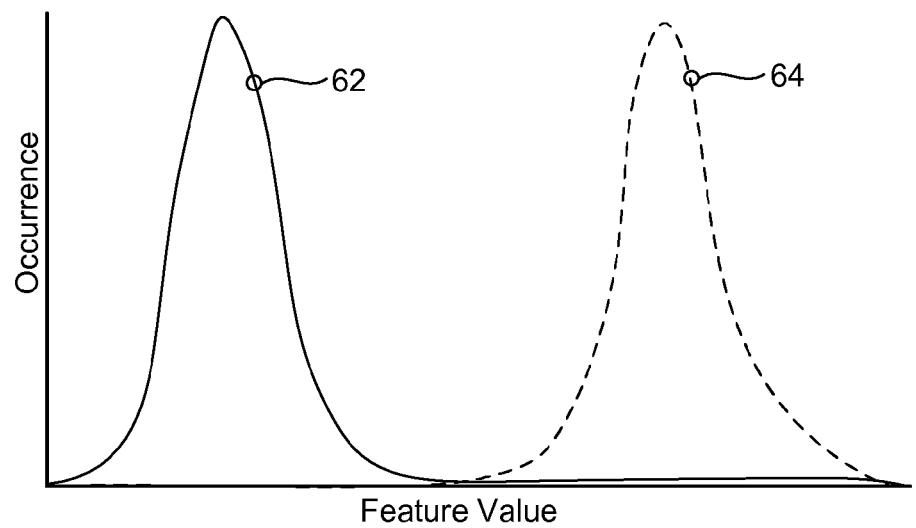
FIG. 6 is an exemplary histogram showing feature value separation.

FIG. 6 shows another example of normalized frequency-of-occurrence plots of the values of a feature for two different image regions. The solid line 62 shows the frequency of occurrence of feature values extracted from image samples belonging to one region. The dashed line 64 shows the frequency of occurrence of feature values extracted from image samples belonging to a second region. The wide separation of these two curves may indicate that the feature will be an effective feature for classifying image samples as belonging to one of these two regions.

For the purposes of this specification, associated claims, and included drawings, the term histogram will be used to refer to frequency-of-occurrence information in any form or format, for example, that represented as an array, a plot, a linked list and any other data structure associating a frequency-of-occurrence count of a value, or group of values, with the value, or group of values. The value, or group of values, may be related to an image characteristic, for example, color (luminance or chrominance), edge intensity, edge direction, texture, and any other image characteristic.

Embodiments of the present invention comprise methods and systems for region detection in a digital image. Some embodiments of the present invention comprise methods and systems for region detection in a digital image wherein the separation between feature values corresponding to image regions may be accomplished by masking, prior to feature extraction, pixels in the image for which a masking condition is met. In some embodiments, the masked pixel values may not be used when extracting the feature value from the image.

Figure 7:
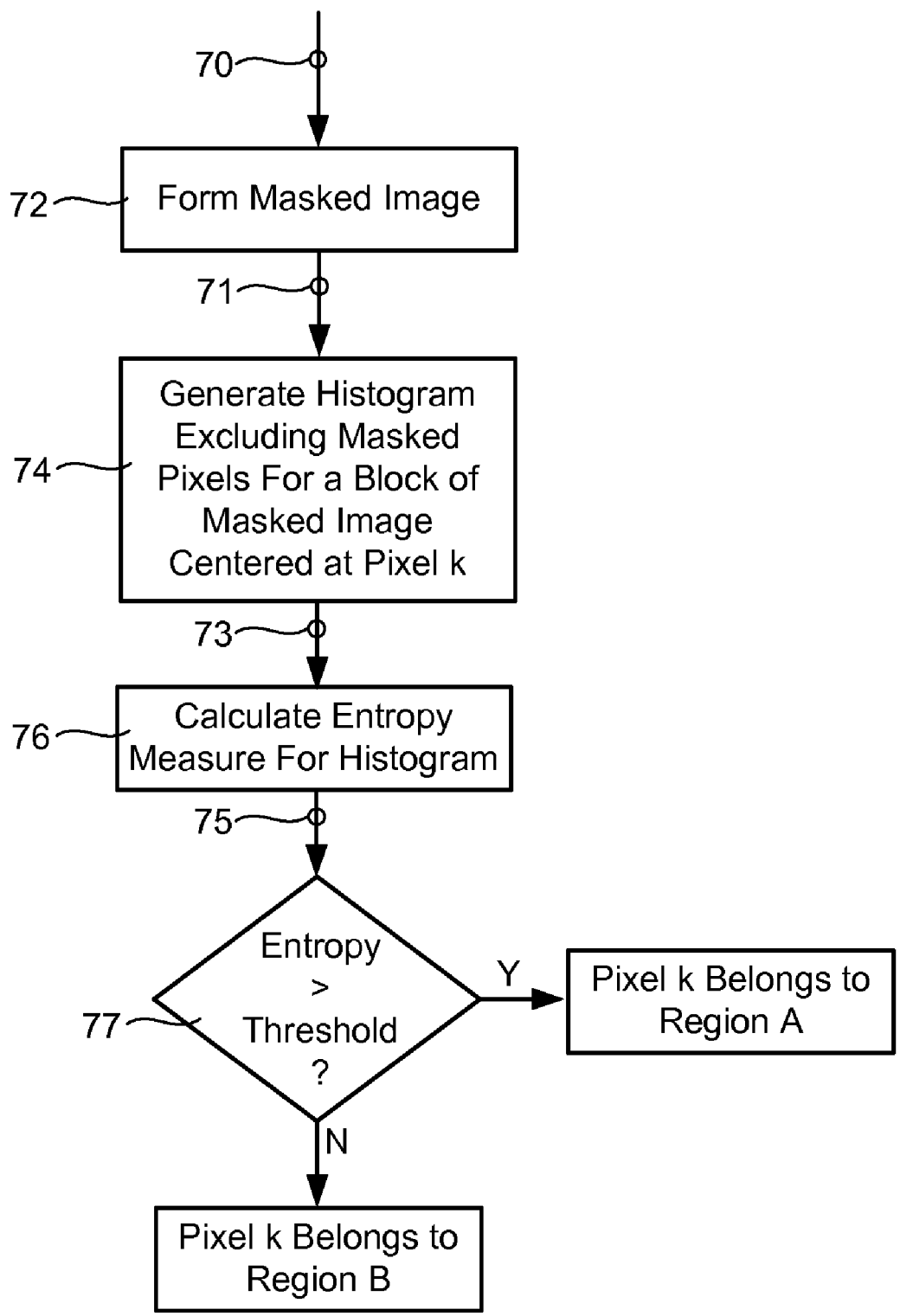
FIG. 7 is a diagram showing exemplary embodiments of the present invention comprising a masked-entropy calculation from a histogram.
Figure 8:
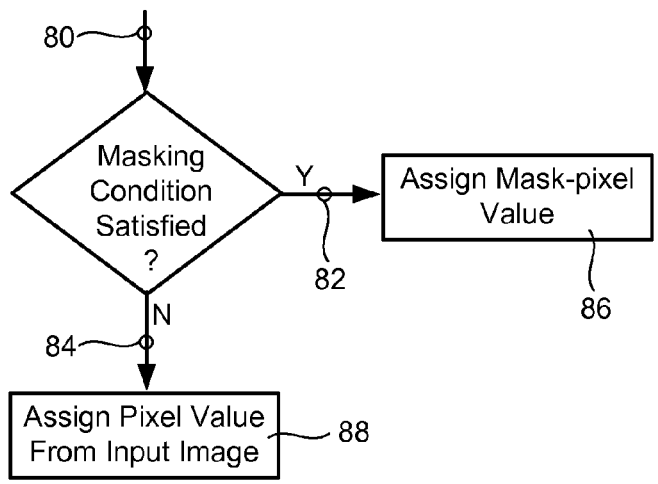
FIG. 8 is a diagram showing an exemplary embodiment of masked-image generation.

In some exemplary embodiments of the present invention shown in FIG. 7, a masked image 71 may be formed 72 from an input image 70. The masked image 71 may be formed 72 by checking a masking condition at each pixel in the input image 70. An exemplary embodiment shown in FIG. 8 illustrates the formation of the masked image. If an input-image pixel 80 satisfies 82 the masking condition, the value of the pixel at the corresponding location in the masked image may be assigned 86 a value, which may be called a mask-pixel value, indicating that the masking condition is satisfied at that pixel location in the input image. If an input-image pixel 80 does not satisfy 84 the masking condition, the value of the pixel at the corresponding location in the masked image may be assigned the value of the input pixel in the input image 88. The masked image thereby masks pixels in the input image for which a masking condition is satisfied.

In the exemplary embodiments of the present invention shown in FIG. 7, after forming 72 the masked image 71, a histogram 73 may be generated 74 for a block, also considered a segment, section, or any division, not necessarily rectangular in shape, of the masked image 71. For the purposes of this specification, associated claims, and included drawings, the term block will be used to describe a portion of data of any shape including, but not limited to, square, rectangular, circular, elliptical, or approximately circular.

Figure 9:
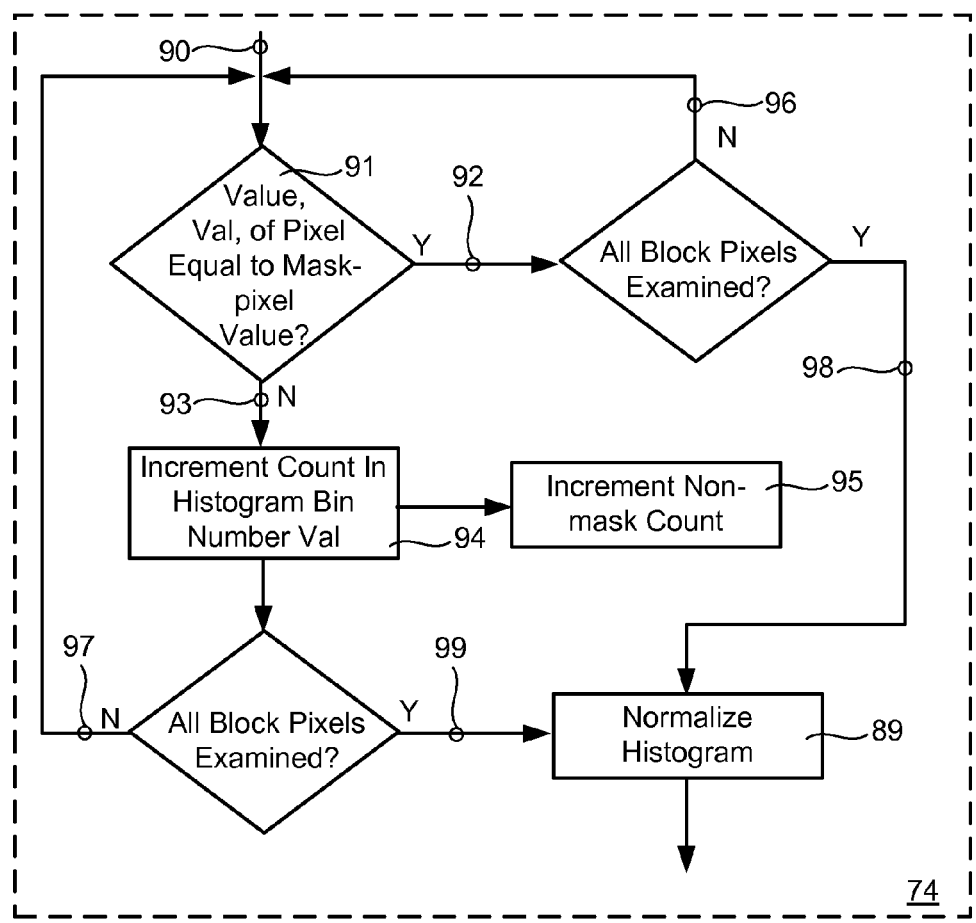
FIG. 9 is a diagram showing an exemplary embodiment of histogram generation.

FIG. 9 shows an exemplary embodiment of histogram formation 74. A histogram with bins corresponding to the possible pixel values of the masked image may be formed according to FIG. 9. In some embodiments, all bins may be initially considered empty with initial count zero. The value of a pixel 90 in the block of the masked image may be compared 91 to the mask-pixel value. If the value of the pixel 90 is equal 92 to the mask-pixel value, then the pixel is not accumulated in the histogram, meaning that no histogram bin is incremented, and if there are pixels remaining in the block to examine 96, then the next pixel in the block is examined 91. If the value of the pixel 90 is not equal 93 to the mask-pixel value, then the pixel is accumulated in the histogram 94, meaning that the histogram bin corresponding to the value of the pixel is incremented, and if there are pixels remaining in the block to examine 97, then the next pixel is examined 91.

When a pixel is accumulated in the histogram 94, a counter for counting the number of non-mask pixels in the block of the masked image may be incremented 95. When all pixels in a block have been examined 98, 99, the histogram may be normalized 89. The histogram may be normalized 89 by dividing each bin count by the number of non-mask pixels in the block of the masked image. In alternate embodiments, the histogram may not be normalized and the counter may not be present.

Alternately, the masked image may be represented in two components: a first component that is a binary image, also considered a mask, in which masked pixels may be represented by one of the bit values and unmasked pixels by the other bit value, and a second component that is the digital image. The logical combination of the mask and the digital image forms the masked image. The histogram formation may be accomplished using the two components of the masked image in combination.

An entropy measure 75 may be calculated 76 for the histogram 73 of a block of the masked image. The entropy measure 75 may be considered an image feature of the input image. The entropy measure 75 may be considered any measure of the form:

$$-\sum_{i=1}^{N} h(i) * f(h(i)),$$

where N is the number of histogram bins, h(i) is the accumulation or count of bin i, and $f(\cdot)$ may be a function with mathematical characteristics similar to a logarithmic function. The entropy measure 75 may be weighted by the proportion of pixels that would have been counted in a bin, but were masked. The entropy measure is of the form:

$$-\sum_{i=1}^{N} w(i)h(i) * f(h(i))$$

where w(i) is the weighting function. In some embodiments of the present invention, the function $f(h(i))$ may be $\log_2(h(i))$.

In the embodiments of the present invention shown in FIG. 7, after calculating 76 the entropy measure 75 for the histogram 73 corresponding to a block of the image centered at a pixel, the pixel may be classified 77 according to the entropy feature 75. In some embodiments, the classifier 77 may be based on thresholding. A threshold may be determined a priori, adaptively, or by any of numerous methods. The pixel may be classified 77 as belonging to one of two regions depending on which side of the threshold the entropy measure 75 falls.

Figure 10:
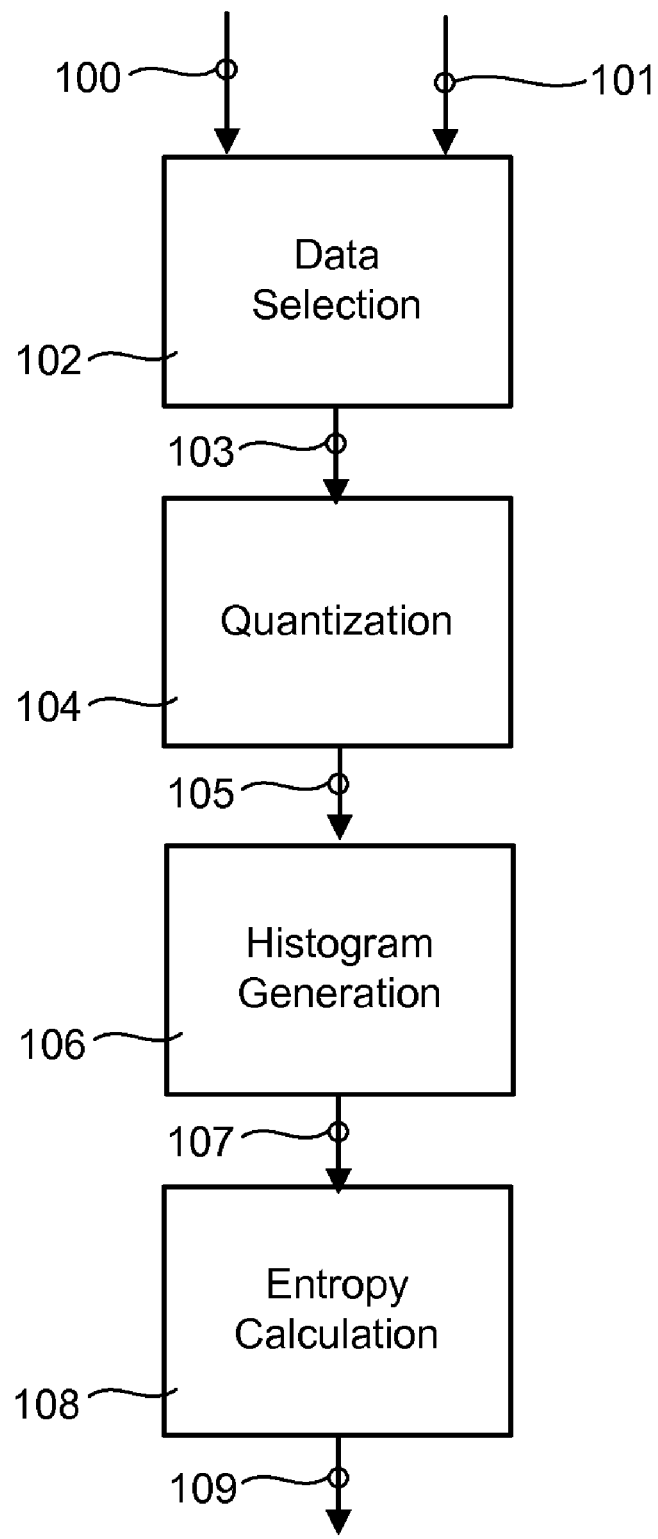
FIG. 10 is a diagram showing exemplary embodiments of the present invention comprising masking, quantization, histogram generation and entropy calculation.

In some embodiments of the present invention shown in FIG. 10, a digital image 100 and a corresponding mask image 101 may be combined 102 to form masked data 103. The masked data 103 may be quantized 104 forming quantized, masked data 105. The histogram 107 of the quantized, masked data 105 may be generated 106, and an entropy measure 109 may be calculated 108 using the histogram of the quantized, masked data 107. The computational expense of the histogram generation 106 and the entropy calculation 108 may depend on the level, or degree, of quantization of the masked data. The number of histogram bins may depend of the number of quantization levels, and the number of histogram bins may influence the computational expense of the histogram generation 106 and the entropy calculation 108. Due to scanning noise and other factors, uniform areas in a document may not correspond to a single color value in a digital image of the document. In some embodiments of the present invention shown in FIG. 10, the degree of quantization may be related to the expected amount of noise for a uniformly colored area on the document. In some embodiments, the quantization may be uniform. In alternate embodiments, the quantization may be variable. In some embodiments, the quantization may be related to a power of two. In some embodiments in which the quantization is related to a power of two, quantization may be implemented using shifting.

In some embodiments of the present invention, the masked data may not be quantized, but the number of histogram bins may be less than the number of possible masked data values. In these embodiments, a bin in the histogram may represent a range of masked data values.

Figure 11:
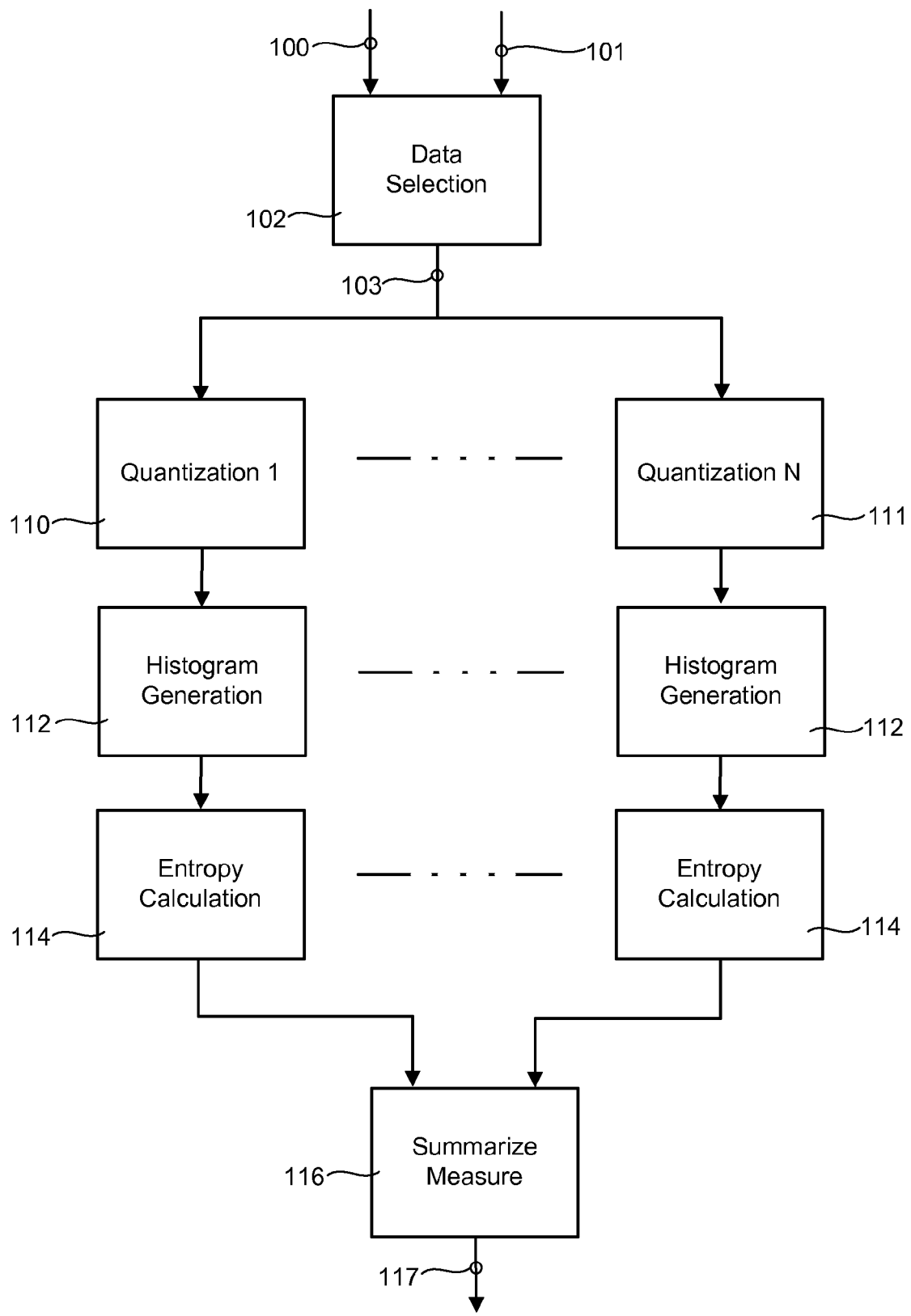
FIG. 11 is a diagram showing exemplary embodiments of the present invention comprising multiple quantization of select data and multiple entropy calculations.

In some embodiments of the present invention shown in FIG. 11, quantization 110, 111, histogram generation 112, and calculation of entropy 114 may be performed multiple times on the masked data 103 formed by the combination 102 of the digital image 100 and the corresponding mask image 101. The masked data may be quantized using different quantization methods 110, 111. In some embodiments, the different quantization methods may correspond to different levels of quantization. In some embodiments, the different quantization methods may be of the same level of quantization with histogram bin boundaries shifted. In some embodiments, the histogram bin boundaries may be shifted by one-half of a bin width. A histogram may be generated 112 from the data produced by each quantization method 110, 111, and an entropy calculation 114 may be made for each histogram. The multiple entropy measures produced may be combined 116 to form a single measure 117. The single entropy measure may be the average, the maximum, the minimum, a measure of the variance, or any other combination of the multiple entropy measures.

Figure 12:
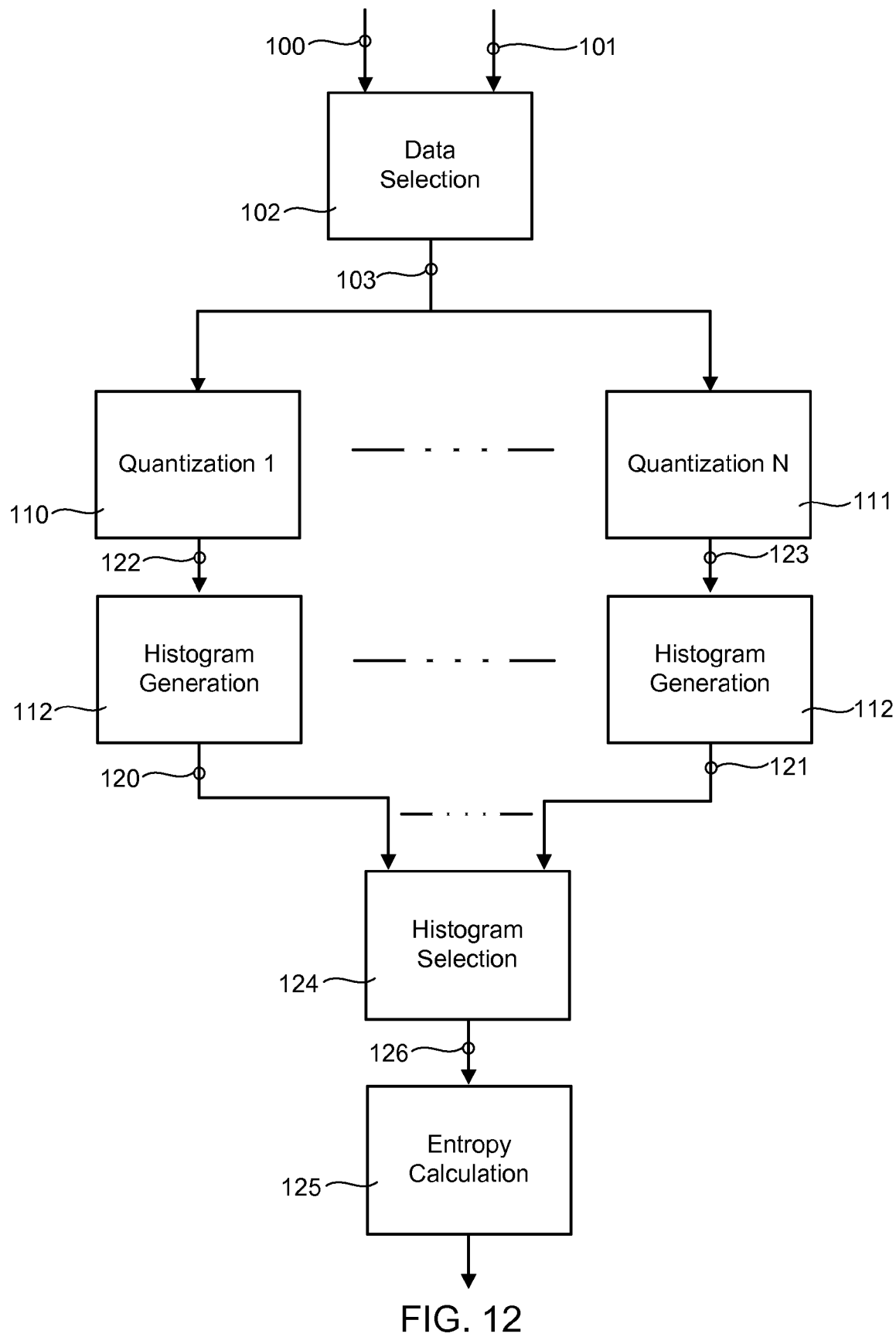
FIG. 12 is a diagram showing exemplary embodiments of the present invention comprising multiple quantizations of select data.

In alternate embodiments of the present invention shown in FIG. 12, data 103 formed by the combination 102 of the digital image 100 and the corresponding mask image 101 may be quantized using different quantization methods 110, 111. Multiple histograms 120, 121 may be formed 112 based on multiple quantizations 122, 123. One histogram 126 from the multiple histograms 120, 121 may be selected 124 for the entropy calculation 125. In some embodiments, the entropy calculation may be made using the histogram with the largest single-bin count. In alternate embodiments, the histogram with the largest single lobe may be used.

Figure 13:
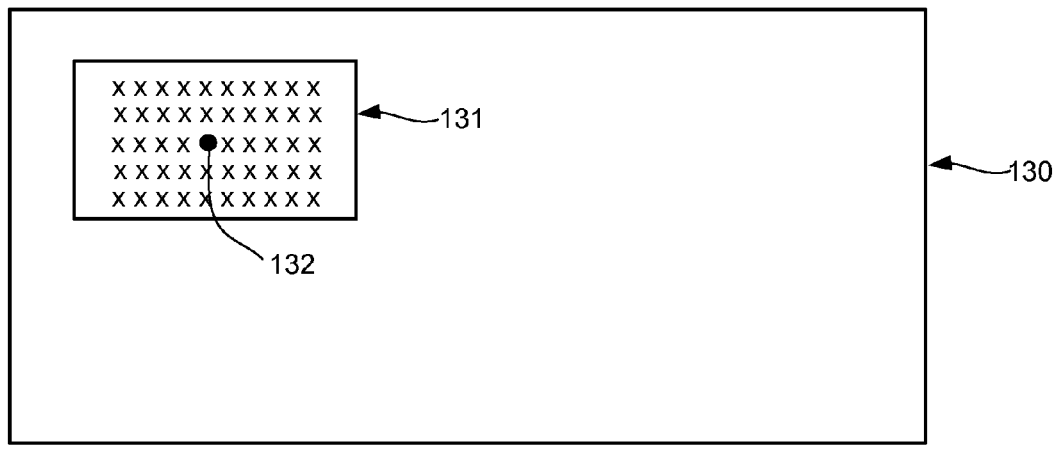
FIG. 13 is a diagram showing pixel classification comprising an image window.

In some embodiments of the present invention, a moving window of pixel values centered, in turn, on each pixel of the image, may be used to calculate the entropy measure for the block containing the centered pixel. The entropy may be calculated from the corresponding block in the masked image. The entropy value may be used to classify the pixel at the location on which the moving window is centered. FIG. 13 shows an exemplary embodiment in which a block of pixels is used to measure the entropy feature which is used to classify a single pixel in the block. In FIG. 13, a block 131 is shown for an image 130. The pixels in the masked image in the block 131 may be used to calculate the entropy measure, which may be considered the entropy measure at pixel 132. The pixel in the center of the block 132 may be classified according the entropy measure.

Figure 14:
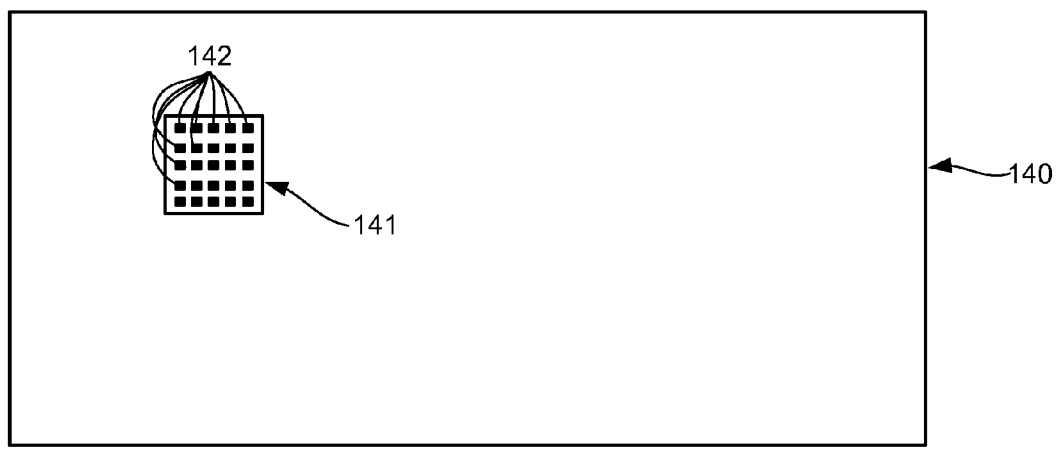
FIG. 14 is a diagram showing block classification comprising an image window.

In other embodiments of the present invention, the entropy value may be calculated for a block of the image, and all pixels in the block may be classified with the same classification based on the entropy value. FIG. 14 shows an exemplary embodiment in which a block of pixels is used to measure the entropy feature which is used to classify all pixels in the block. In FIG. 14, a block 141 is shown for an image 140. The pixels in the masked image in the corresponding block may be used to calculate the entropy measure. All pixels 142 in the block 141 may be classified according to the entropy measure.

In some embodiments of the present invention shown in FIG. 15, the entropy may be calculated considering select lobes, also considered peaks, of the histogram. A digital image 100 and a corresponding mask image 101 may be combined 102 to form masked data 103. The masked data 103 may be quantized 104 forming quantized, masked data 105. The histogram 107 of the quantized, masked data 105 may be generated 106, a modified histogram 151 may be generated 150 to consider select lobes of the histogram 107, and an entropy measure 153 may be calculated 152 using the modified histogram of the quantized, masked data 151. In some embodiments, a single lobe of the histogram 107 may be considered. In some embodiments, the single lobe may be the lobe containing the image value of the center pixel of the window of image data for which the histogram may be formed.

FIG. 16 shows embodiments of the present invention in which a digital image 160 may be combined 163 with output 162 of a pixel-selection module 161 to generate data 164 which may be considered in the entropy calculation. The data 164 may be quantized 165. A histogram 168 may be formed 167 from the quantized data 166, and an entropy measure 159 may be calculated 169 for the histogram 168. The pixel-selection module 161 comprises pixel-selection logic that may use multiple masks 157, 158 as input. A mask 157, 158 may correspond to an image structure. Exemplary image structures may include text, halftone, page background, and edges. The pixel-selection logic 161 generates a selection mask 162 that is combined with the digital image 160 to select image pixels that may be masked in the entropy calculation.

In some embodiments of the present invention, the masking condition may be based on the edge strength at a pixel.

In some embodiments of the present invention, a level of confidence in the degree to which the masking condition is satisfied may be calculated. The level of confidence may be used when accumulating a pixel into the histogram. Exemplary embodiments in which a level of confidence is used are shown in FIG. 17.

Figure 17:
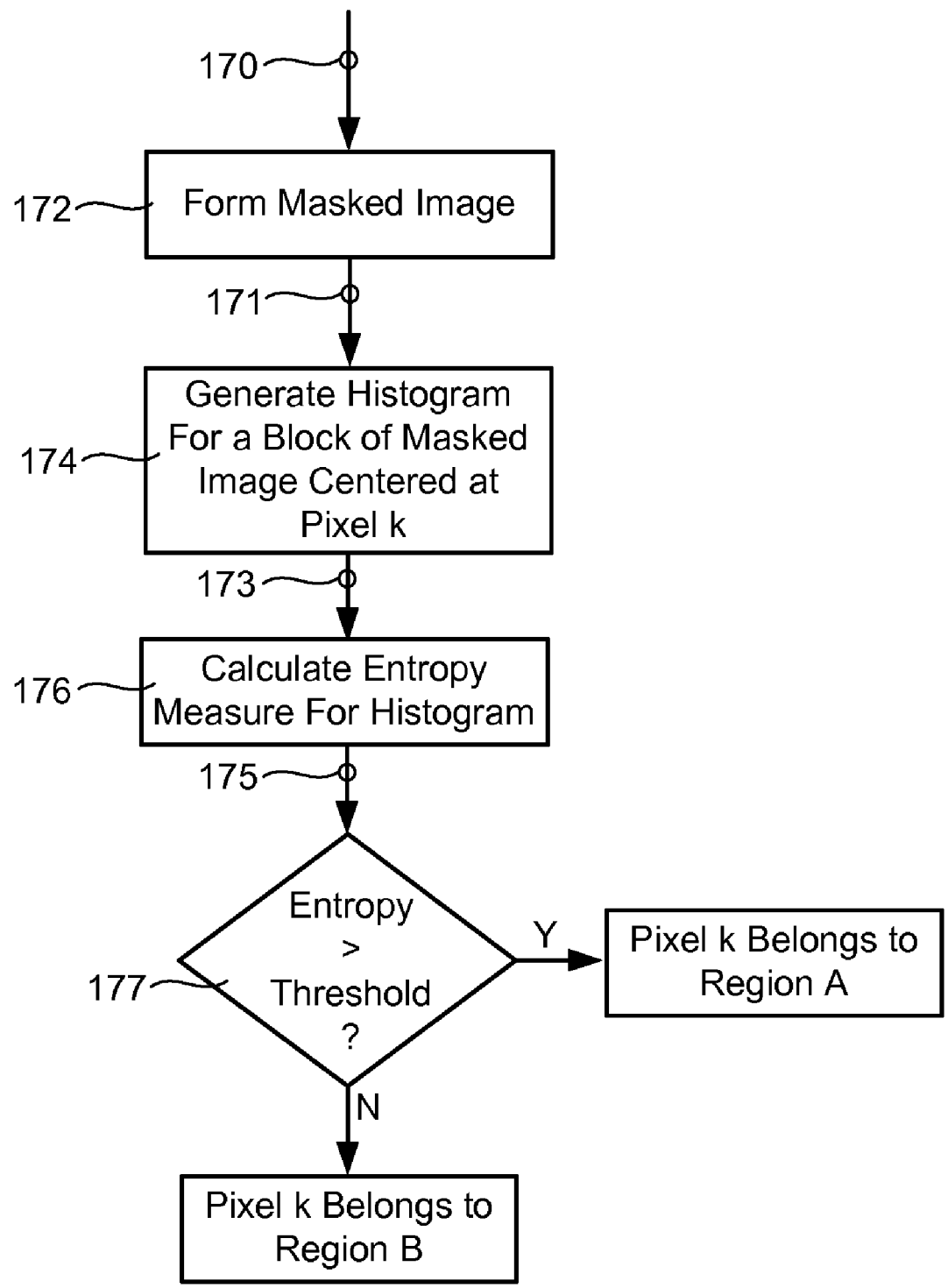
FIG. 17 is a diagram showing exemplary embodiments of the present invention comprising a masked-entropy calculation from a histogram using confidence levels.
Figure 18:
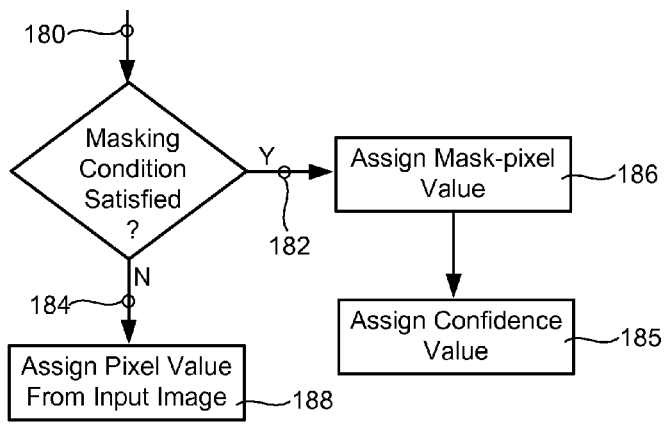
FIG. 18 is a diagram showing an exemplary embodiment of masked-image generation using confidence levels.

In exemplary embodiments of the present invention shown in FIG. 17, a masked image 171 may be formed 172 from an input image 170. The masked image 171 may be formed by checking a masking condition at each pixel in the input image 170. An exemplary embodiment shown in FIG. 18, illustrates the formation 172 of the masked image 171. If an input image pixel 180 satisfies 182 the masking condition, the corresponding pixel in the masked image may be assigned 186 a value, mask-pixel value, indicating that the masking condition is satisfied at that pixel. If an input image pixel 180 does not satisfy the masking condition 184, the corresponding pixel in the masked image may be assigned the value of the corresponding pixel in the input image 188. At pixels for which the masking condition is satisfied 182, a further assignment 185 of a confidence value reflecting the confidence in the mask signature signal may be made. The assignment of confidence value may be a separate value for the masked pixels, or the mask-pixel value may be multi-level with the levels representing the confidence. The masked image may mask pixels in the input image for which a masking condition is satisfied, and further identify the level to which the masking condition is satisfied.

Figure 19:
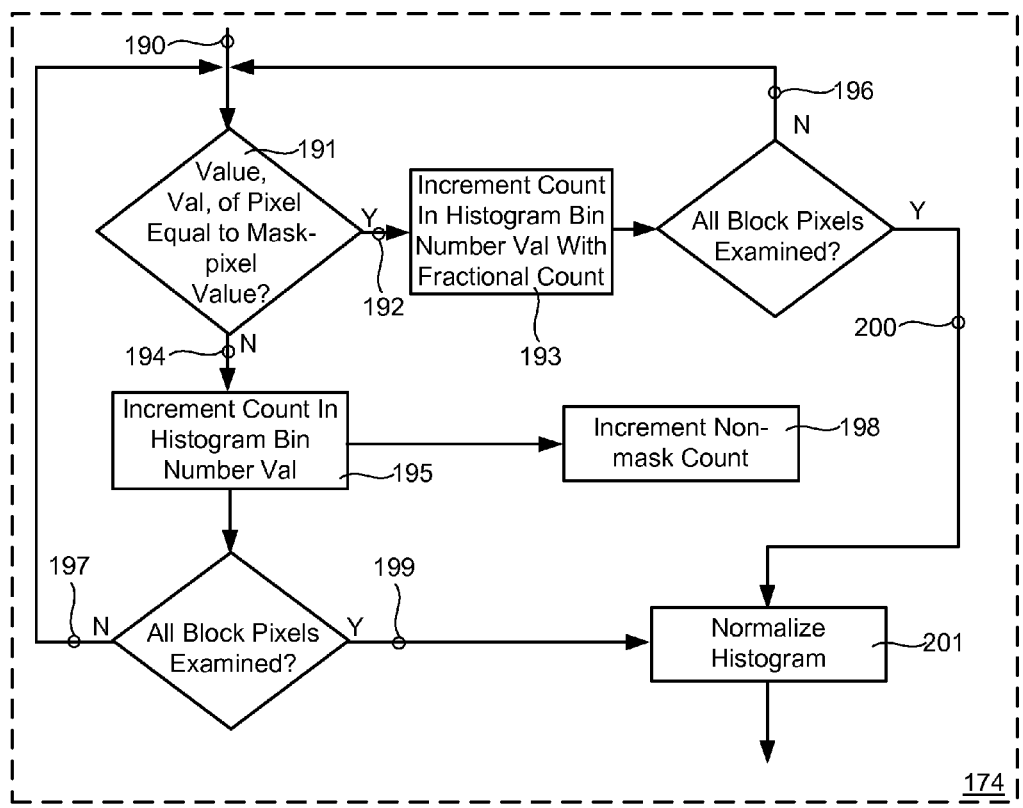
FIG. 19 is a diagram showing an exemplary embodiment of histogram generation using confidence levels.

In the exemplary embodiments of the present invention shown in FIG. 17, after forming 172 the masked image 171, a histogram 173 may be generated 174 for a block of the masked image 171. FIG. 19 shows an exemplary embodiment of histogram formation 174. A histogram with bins corresponding to the possible pixel values of the masked image may be formed according to FIG. 19. In some embodiments, all bins may be initially considered empty with initial count zero. The value of a pixel 190 in the block of the masked image may be compared 191 to the mask-pixel value. If the value of the pixel 190 is equal 192 to the mask-pixel value, then the pixel is accumulated 193 in the histogram at a fractional count based on the confidence value, and if there are pixels remaining in the block to examine 196, then the next pixel in the block is examined 191. If the value of the pixel 190 is not equal 194 to the mask-pixel value, then the pixel is accumulated in the histogram 195, meaning that the histogram bin corresponding to the value of the pixel is incremented, and if there are pixels remaining in the block to examine 197, then the next pixel in the block is examined 191.

When a pixel is accumulated in the histogram 195, a counter for counting the number of non-mask pixels in the block of the masked image may be incremented 198. When all pixels in a block have been examined 200, 199, the histogram may be normalized 201. The histogram may be normalized 201 by dividing each bin count by the number of non-mask pixels in the block of the masked image. In alternate embodiments, the histogram may not be normalized and the counter not be present.

An entropy measure 175 may be calculated 176 for the histogram of a neighborhood of the masked image as described in the previous embodiments. In the embodiments of the present invention shown in FIG. 17, after calculating 176 the entropy measure 175 for the histogram 173 corresponding to a block of the image centered at a pixel, the pixel may be classified 177 according to the entropy feature 175. The classifier 177 shown in FIG. 17 may be based on thresholding. A threshold may be determined a priori, adaptively, or by any of numerous methods. The pixel may be classified 177 as belonging to one of two regions depending on which side of the threshold the entropy measure 175 falls.

In some embodiments of the present invention, the masking condition may comprise a single image condition. In some embodiments, the masking condition may comprise multiple image conditions combined to form a masking condition.

In some embodiments of the present invention, the entropy feature may be used to separate the image into two regions. In some embodiments of the present invention, the entropy feature may be used to separate the image into more than two regions.

In some embodiments of the present invention, the full dynamic range of the data may not be used. The histogram may be generated considering only pixels with values between a lower and an upper limit of dynamic range.

In some embodiments of the present invention, the statistical entropy measure may be as follows:

$$E = -\sum_{i=1}^{N} h(i) * \log_2(h(i)),$$

where N is the number of bins, h(i) is the normalized ($\Sigma_{i=1}^{N} h(i)=1$) histogram count for bin i, and $\log_2(0)=1$ may be defined for empty bins.

The maximum entropy may be obtained for a uniform histogram distribution, $$h(i) = \frac{1}{N},$$

for every bin. Thus, $$Emax = -\sum_{i=1}^{N} \frac{1}{N} * \log_2\left(\frac{1}{N}\right) = -\log_2\left(\frac{1}{N}\right).$$

The entropy calculation may be transformed into fixed-point arithmetic to return an unsigned, 8-bit, uint8, measured value, where zero corresponds to no entropy and 255 corresponds to maximum entropy. The fixed-point calculation may use two tables: one table to replace the logarithm calculation, denoted log_table below, and a second table to implement division in the histogram normalization step, denoted rev_table. Integer entropy calculation may be implemented as follows for an exemplary histogram with nine bins:

$$\text{log\_table}[i] = 2^{log\_shift} * \log_2(i)$$

$$s = \sum_{i=0}^{8} hist[i]$$

$$\text{rev\_table}[i] = \frac{2^{rev\_shift} * \frac{255}{Emax}}{i}$$

$$\text{s\_log} = \text{log\_table}[s]$$

$$\text{s\_rev} = \text{rev\_table}[s]$$

$$bv[i] = hist[i] * \text{s\_rev}$$

$$\text{log\_diff}[i] = \text{s\_log} - \text{log\_table}[hist[i]]$$

$$E = \left(\sum_{i=0}^{NBins} ((bv[i] * \text{log\_diff}[i]) \gg (\text{log\_shift} + \text{rev\_shift} - \text{accum\_shift})\right) \gg \text{accum\_shift}$$

where log_shift, rev_shift, and accum_shift may be related to the precision of the log, division, and accumulation operations, respectively.

An alternate hardware implementation may use an integer divide circuit to calculate n, the normalized histogram bin value.

$$n = (hist[i] \ll 8)/s$$
$$Ebin = (81 * n * \log\_table[n]) \gg 16$$
$$E = \sum_{i=0}^{NBins} Ebin[i].$$

In the example, the number of bins is nine (N=9), which makes the normalization multiplier 255/Emax=81. The fixed-point precision of each calculation step may be adjusted depending upon the application and properties of the data being analyzed. Likewise the number of bins may also be adjusted.

Figure 20:
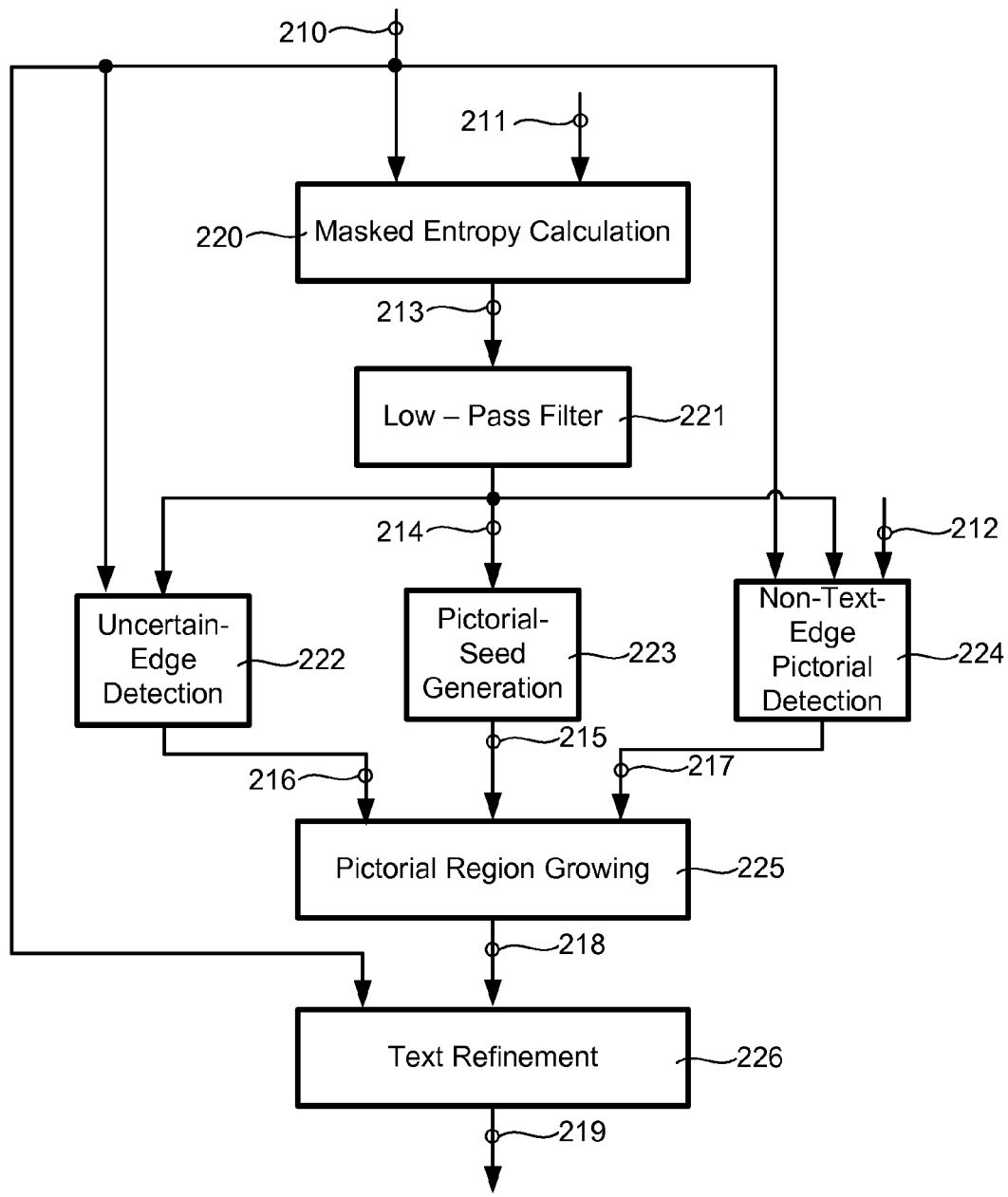
FIG. 20 is a diagram showing embodiments of the present invention comprising entropy-based discrimination of pictorial regions used in text refinement.

In some embodiments of the present invention shown in FIG. 20, a masked entropy feature 213 may be generated 220 for a luminance channel 211 of the input image using the textCandidateMap as a mask 210. In some embodiments the luminance channel 211 used in the masked entropy feature calculation 220 may be the same resolution as the digital image. In other embodiments, the resolution of the luminance channel 211 used in the masked entropy feature calculation 220 may be of lower resolution than the digital image. In some embodiments of the present invention, the masked entropy feature may be low-pass filtered 221 producing an entropy measure, referred to as average entropy, with a larger region of support 214.

In some embodiments of the present invention, the luminance channel of a 600 dpi image may be down-sampled to 75 dpi and combined with a 75 dpi textCandidateMap to generate a 75 dpi masked entropy feature array, also considered image, by using an 11×11 moving window to calculated the masked entropy using any of the above disclosed methods. The resulting masked entropy feature array may then be filtered using a 3×3 averaging filter.

Pictorial regions 215 may be grown from the average entropy 214 using a double, or hysteresis, threshold process 223. In some embodiments, the upper threshold may be 200, and the lower threshold may be 160. The pictorial regions 215 grown 223 from the average entropy 214 may be indicated by a one-bit map, referred to as pictEnt.

The average entropy 214 and the map 210 used in the masked entropy calculation 220 may be combined 222 to form a one-bit map 216 indicating that a pixel is an uncertain edge pixel. If the average entropy at a pixel is high and that pixel is a text candidate, then the pixel may be a text pixel, or the pixel may belong to an edge in a pictorial region. The one-bit map 216, referred to as inText, may be generated according to the following logic: textCandidateMap & (aveEnt≧TH6). In some embodiments, TH6 may be 80.

The average entropy 214, the map 210, and a thresholded version of the edgeCnt 212 may be combined 224 to form a one-bit map 217, referred to as inPict, indicating if a non-text edge pixel pixel has a high likelihood of belonging to a pictorial region. The one-bit map 217 may be generated according to the following logic: (edgeCntTH&~textCandidateMap)|(aveEnt>TH7). In some embodiments TH7 may be 200.

Figure 21A:
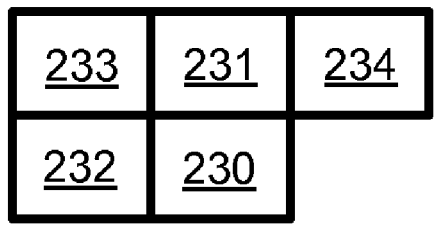
FIG. 21A shows the four causal neighbors for a top-left to bottom-right scan pass.
Figure 21B:
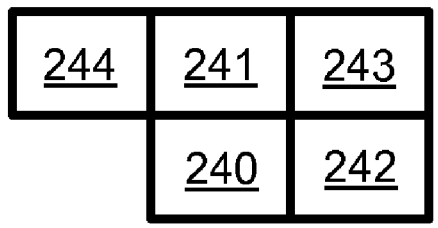
FIG. 21B shows the four causal neighbors for a top-right to bottom-left scan pass.
Figure 21C:
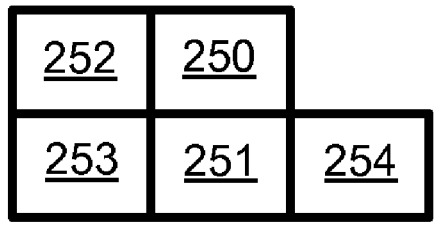
FIG. 21C shows the four causal neighbors for a bottom-left to top-right scan pass.
Figure 21D:
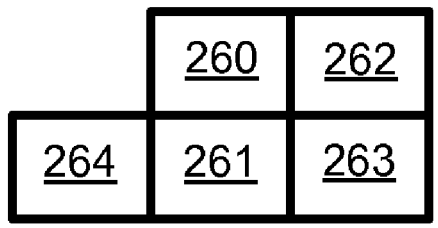
FIG. 21D shows the four causal neighbors for a bottom-right to top-left scan pass.

The three results, pictEnt 215, inText 216 and inPict 217 may be combined in a pictorial region growing process 225 thereby producing a multi-value image whereby higher values indicate higher likelihood a pixel belongs to a pictorial region, PictCnt, 218. In some embodiments of the present invention, the pictorial region growing process 225 at each pixel may be a counting process using four neighboring pixels where the four neighbors may be the four causal neighbors for a scan direction. FIG. 21A shows the four pixel neighbors 231-234 of pixel 230 considered for a top-left to bottom-right scan direction. FIG. 21B shows the four pixel neighbors 241-244 of pixel 240 considered for a top-right to bottom-left scan direction. FIG. 21C shows the four pixel neighbors 251-254 of pixel 250 considered for a bottom-left to top-right scan direction. FIG. 21D shows the four pixel neighbors 261-264 of pixel 260 considered for a bottom-right to top-left scan direction. The counting process may be performed for multiple scan passes accumulating the count from each previous pass.

In some embodiments, four scan passes may be performed sequentially. The order of the scans may be top-left to bottom-right, top-right to bottom-left, bottom-left to top-right and bottom-right to top-left. In some embodiments, the value PictCnt(i, j) at a pixel location (i, j), where i may denote the row index and j may denote the column index, may be given by the following for the order of scan passes described above where the results are propagated from scan pass to scan pass.

Top-left to bottom-right:

```
maxCnt = MAX(PictCnt(i, j−1), PictCnt(i−1, j));
maxCnt = MAX(maxCnt, PictCnt(i−1, j−1));
maxCnt = MAX(maxCnt, PictCnt(i−1, j+1));
if (inPict(i, j) & pictEnt(i, j))
    pictCnt(i, j) = maxCnt + 1;
else if (inPict(i, j) | pictEnt(i, j))
    pictCnt(i, j) = maxCnt;
else if (inText(i, j)) {
    cnt = PictCnt(i, j−1)    > TH ? 1 : 0;
    cnt = PictCnt(i−1, j)    > TH ? cnt+1 : cnt;
    cnt = PictCnt(i−1, j−1)  > TH ? cnt+1 : cnt;
    cnt = PictCnt(i−1, j+1)  > TH ? cnt+1 : cnt;
    PictCnt(i, j) = maxCnt − (16 − cnt*4);
}
else
    PictCnt(i, j) = 0;
PictCnt(i, j) = PictCnt(i, j) > 255 ? 255 : PictCnt(i, j);
PictCnt(i, j) = PictCnt(i, j) < 0 ? 0 : PictCnt(i, j);
```

Top-right to bottom-left:

```
maxCnt = MAX(PictCnt(i, j+1), PictCnt(i−1, j));
maxCnt = MAX(maxCnt, PictCnt(i−1, j+1));
maxCnt = MAX(maxCnt, PictCnt(i−1, j−1));
if (inPict(i, j) & pictEnt(i, j))
    pictCnt(i, j) = maxCnt + 1;
else if (inPict(i, j) | pictEnt(i, j))
    pictCnt(i, j) = maxCnt;
else if (inText(i, j)) {
    cnt = PictCnt(i, j+1)    > TH ? 1 : 0;
    cnt = PictCnt(i−1, j)    > TH ? cnt+1 : cnt;
    cnt = PictCnt(i−1, j+1)  > TH ? cnt+1 : cnt;
    cnt = PictCnt(i−1, j−1)  > TH ? cnt+1 : cnt;
    PictCnt(i, j) = maxCnt − (16 − cnt*4);
}
else
    PictCnt(i, j) = 0;
PictCnt(i, j) = PictCnt(i, j) < 0 ? 0 : PictCnt(i, j);
Bottom-left to top-right:
maxCnt = MAX(PictCnt(i, j−1), PictCnt(i+1, j));
maxCnt = MAX(maxCnt, PictCnt(i+1, j−1));
maxCnt = MAX(maxCnt, PictCnt(i+1, j+1));
if (inPict(i, j) & pictEnt(i, j))
    pictCnt(i, j) = maxCnt + 1;
else if (inPict(i, j) | pictEnt(i, j))
    pictCnt(i, j) = maxCnt;
else if (inText(i, j)) {
    cnt = PictCnt(i, j−1)    > TH ? 1 : 0;
    cnt = PictCnt(i+1, j)    > TH ? cnt+1 : cnt;
    cnt = PictCnt(i+1, j−1)  > TH ? cnt+1 : cnt;
```

```
        cnt = PictCnt(i+1, j+1)    > TH ? cnt+1 : cnt;
        PictCnt(i, j) = maxCnt - (16 - cnt*4);
    }
    else
        PictCnt(i, j) = 0;
    PictCnt(i, j) = PictCnt(i, j) < 0 ? 0 : PictCnt(i, j);
```

Bottom-right to top-left:

```
    maxCnt = MAX(PictCnt(i, j+1), PictCnt(i+1, j));
    maxCnt = MAX(maxCnt, PictCnt(i+1, j+1));
    maxCnt = MAX(maxCnt, PictCnt(i+1, j-1));
    if (inPict(i, j) & pictEnt(i, j))
        pictCnt(i, j) = maxCnt + 1;
    else if (inPict(i, j) | pictEnt(i, j))
        pictCnt(i, j) = maxCnt;
    else if (inText(i, j)) {
        cnt = PictCnt(i, j+1)      > TH ? 1 : 0;
        cnt = PictCnt(i+1, j)      > TH ? cnt+1 : cnt;
        cnt = PictCnt(i+1, j+1)    > TH ? cnt+1 : cnt;
        cnt = PictCnt(i+1, j-1)    > TH ? cnt+1 : cnt;
        PictCnt(i, j) = maxCnt - (16 - cnt*4);
    }
    else
        PictCnt(i, j) = 0;
    PictCnt(i, j) = PictCnt(i, j) < 0 ? 0 : PictCnt(i, j);
```

The pictorial likelihood, PictCnt, and the candidate text map, textCandidateMap, may be combined 226 to form a refined text map, rText, 219. The combination may be generated on a pixel-by-pixel basis according to: (PictCnt<TH8) & textCandidateMap, where in some embodiments TH8 is 48.

Embodiments of the present invention as shown in FIG. 2 may comprise a clean-up pass 24 after the entropy-based pictorial region discrimination and refinement of the text candidate map 22. The clean-up pass may comprise morphological operations on the refined text map, rText, using PictCnt as support information to control the structuring element.

In some embodiments, the lower resolution result from text cleanup process may be combined with higher resolution edge map to produce a high resolution verified text map.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for identifying text in a digital image, said method comprising:
    receiving a first feature data set comprising measurements of a first feature on a digital image;
    receiving a confidence data set related to said first feature data set, wherein said confidence data set indicates a confidence level of the measurements of said first feature data set;
    receiving digital image data related to said digital image;
    calculating a pictorial feature for said digital image data using said first feature data set and said confidence data set;
    forming a pictorial confidence image using said pictorial feature and said first feature data set; and
    generating a text-map based on said pictorial confidence image.

2. A method as described in claim 1 wherein said pictorial feature is masked entropy.

3. A method as described in claim 1 wherein said first feature is an edge feature.

4. A method as described in claim 1 wherein said digital image data is a luminance image.

5. A method as described in claim 1 wherein the resolution of said digital image data is less than the resolution of said first feature data set.

6. A method as described in claim 1 further comprising generating a mask from said first feature data set and said confidence data set.

7. A method as described in claim 1 wherein said forming a pictorial confidence image further comprises hysteresis thresholding.

8. A method as described in claim 1 wherein said forming a pictorial confidence image further comprises a plurality of scan passes.

9. A method as described in claim 8 wherein said number of scan passes is four.

10. A method as described in claim 1 wherein said pictorial confidence image and said first feature data set have the same resolution.

* * * * *